US011677900B2

(12) United States Patent
Nakamura et al.

(10) Patent No.: US 11,677,900 B2
(45) Date of Patent: Jun. 13, 2023

(54) PERSONAL AUTHENTICATION DEVICE (71) Applicant: Panasonic Intellectual Property Management Co., Ltd., Osaka (JP)

(72) Inventors: Yusaku Nakamura, Osaka (JP); Hiroki Etoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/774,218

(22) Filed: Jan. 28, 2020

(65) Prior Publication Data

US 2020/0160081 A1 May 21, 2020

Related U.S. Application Data (63) Continuation of application No. PCT/JP2018/028715, filed on Jul. 31, 2018.

(30) Foreign Application Priority Data

Aug. 1, 2017 (JP) .............................. JP2017-149349

(51) Int. Cl.
G06V 10/141 (2022.01)
H04N 5/232 (2006.01)
(Continued)

(52) U.S. Cl.
CPC .......... *G06V 10/141* (2022.01); *G06V 40/166* (2022.01); *G06V 40/172* (2022.01);
(Continued)

(58) Field of Classification Search
CPC ........... G06K 9/00255; G06K 9/00221; G06K 9/00248; G06K 9/00288–9/00295;
(Continued)

(56) References Cited

U.S. PATENT DOCUMENTS 7,530,113 B2 * 5/2009 Braun ...................... G07C 9/22
726/28
8,261,090 B1 * 9/2012 Matsuoka ............... G06F 21/32
713/186
(Continued)

FOREIGN PATENT DOCUMENTS

JP 2004-062846 A 2/2004
JP 2005-339425 A 12/2005
(Continued)

OTHER PUBLICATIONS

International Preliminary Report on Patentability for International Application No. PCT/JP2018/028715, dated Oct. 30, 2018.
(Continued)

*Primary Examiner* — John W Miller
*Assistant Examiner* — Humam M Satti
(74) *Attorney, Agent, or Firm* — Renner, Otto, Boisselle & Sklar, LLP (57) ABSTRACT A personal authentication device includes an infrared ray emitter that emits infrared rays, an infrared camera that captures an infrared image, a status signal outputter that outputs a signal related to a status of the personal authentication device or the status of surroundings of the personal authentication device, and a controller. The controller determines whether or not there is a predetermined change in the status of the personal authentication device or the status of the surroundings of the personal authentication device based on a signal output from the status signal outputter, and when there is the predetermined change, the controller drives the infrared ray emitter and the infrared camera, and performs a three-dimensional face authentication process based on the infrared image captured by the infrared camera.

6 Claims, 6 Drawing Sheets (51) Int. Cl.
  *H04N 5/225* (2006.01)
  *H04N 5/247* (2006.01)
  *G06V 40/16* (2022.01)
(52) U.S. Cl.
  CPC ..... *H04N 5/2256* (2013.01); *H04N 5/232411* (2018.08); *H04N 5/247* (2013.01)
(58) Field of Classification Search
  CPC .. G06K 9/2027; G06K 9/2018; H04N 5/2256; H04N 5/232411; H04N 5/247; H04N 5/33; H04N 5/232; H04N 5/2354; H04N 5/332; H04N 21/42201; H04N 21/42204; H04N 21/4223; G06T 1/00; G06T 7/00; G06V 40/16–179; G06V 40/653; G06V 40/70; G06V 2201/12; G06V 2201/121; G06V 40/00; G06F 21/32; G06F 21/6245; H04W 12/06; H04W 12/062; H04W 12/065
  USPC ..................................... 340/636.18
  See application file for complete search history.

(56) References Cited

U.S. PATENT DOCUMENTS

| | | | | |
|---|---|---|---|---|
| 9,202,105 | B1* | 12/2015 | Wang | G06F 21/32 |
| 9,721,086 | B2* | 8/2017 | Shear | G06F 21/6245 |
| 9,886,640 | B1* | 2/2018 | Chen | G06K 9/2018 |
| 2006/0115120 | A1* | 6/2006 | Taniguchi | B60R 1/00 |
| | | | | 382/104 |
| 2010/0034432 | A1* | 2/2010 | Ono | G06K 9/00255 |
| | | | | 382/118 |
| 2011/0211056 | A1* | 9/2011 | Publicover | H04N 5/2354 |
| | | | | 348/78 |
| 2014/0197922 | A1* | 7/2014 | Stanwood | G06F 21/32 |
| | | | | 340/5.83 |
| 2014/0211078 | A1* | 7/2014 | Watanabe | H04N 5/23296 |
| | | | | 348/351 |
| 2015/0317464 | A1* | 11/2015 | Willis | H04N 5/33 |
| | | | | 348/78 |
| 2016/0057371 | A1* | 2/2016 | Uosawa | A63F 13/655 |
| | | | | 348/164 |
| 2016/0366317 | A1* | 12/2016 | Ivanisov | H04N 5/33 |
| 2017/0154205 | A1* | 6/2017 | Zhao | H04N 21/4223 |
| 2017/0344777 | A1* | 11/2017 | Vissa | G06F 1/169 |
| 2018/0032815 | A1* | 2/2018 | Lee | G06K 9/00604 |
| 2018/0227755 | A1* | 8/2018 | Abernathy | H04W 12/065 |
| 2018/0367656 | A1* | 12/2018 | Kim | H04M 1/72454 |
| 2019/0163964 | A1* | 5/2019 | Kawamae | H04N 9/0451 |

FOREIGN PATENT DOCUMENTS

| | | |
|---|---|---|
| JP | 2007-272877 A | 10/2007 |
| JP | 2007-295449 A | 11/2007 |
| JP | 2007-300451 A | 11/2007 |
| JP | 2008-143220 A | 6/2008 |
| JP | 2010-026858 A | 2/2010 |
| JP | 2011-087306 A | 4/2011 |
| JP | 2016-133685 A | 7/2016 |

OTHER PUBLICATIONS

International Search Report for corresponding Application No. PCT/JP2018/028715, dated Oct. 30, 2018.
Office Action for corresponding Japanese Application No. 2019-534541 dated Apr. 26, 2022 and its English machine translation.
Office Action for corresponding Japanese Application No. 2019-534541 dated Sep. 20, 2022 and its English machine translation.
First Office Action for corresponding Chinese Application No. 201880046942.X dated Feb. 9, 2023 and its machine translation.

* cited by examiner

PERSONAL AUTHENTICATION DEVICE

CROSS-REFERENCE TO RELATED APPLICATIONS

This is a continuation application of International Application No. PCT/JP2018/028715, with an international filing date of Jul. 31, 2018, which claims priority of Japanese Patent Application No.: 2017-149349 filed on Aug. 1, 2017, the content of which is incorporated herein by reference.

BACKGROUND

1. Technical Field

The present disclosure relates to a personal authentication device that performs three-dimensional face authentication using infrared rays.

2. Related Art

JP 2007-300451 A discloses a device for capturing a vein pattern by emitting infrared rays from an infrared ray emitter to a user's hand, and performing authentication based on the captured vein pattern.

SUMMARY

In recent years, in electronic devices such as computers, a technology is beginning to be used in which infrared rays are emitted from the infrared ray emitter to the user's face, the user's face is captured with an infrared camera, and three-dimensional face authentication is performed based on the captured image. In order to improve the accuracy of the three-dimensional face authentication, it is necessary to emit relatively strong infrared rays from the infrared ray emitter, and power consumption is increased.

The present disclosure provides a personal authentication device that reduces the power consumption of three-dimensional face authentication using infrared rays.

A personal authentication device of the present disclosure includes:
an infrared ray emitter that emits infrared rays;
an infrared camera that captures an infrared image;
a status signal outputter that outputs a signal related to a status of the personal authentication device or a status of surroundings of the personal authentication device; and
a controller.

The controller determines whether or not there is a predetermined change in the status of the personal authentication device or the status of the surroundings of the personal authentication device based on a signal output from the status signal outputter, and when there is the predetermined change, the controller drives the infrared ray emitter and the infrared camera, and performs a three-dimensional face authentication process based on the infrared image captured by the infrared camera.

According to the present disclosure, when it is determined that there is a predetermined change in the status of the personal authentication device or the status of the surroundings of the personal authentication device based on the signal output from the status signal outputter, the infrared ray emitter and the infrared camera are driven, and the three-dimensional face authentication process is performed. Therefore, the driving time of the infrared ray emitter and the infrared camera can be reduced, and the power consumption of the three-dimensional face authentication process using infrared rays can be reduced.

DETAILED DESCRIPTION

Hereinafter, embodiments will be described as appropriate in detail with reference to the drawings. However, more detailed description than necessary may be omitted. For example, detailed descriptions of already well-known matters and repeated descriptions for substantially the same configuration may be omitted. This is to avoid the following description from becoming unnecessarily redundant and to facilitate understanding by those skilled in the art.

In addition, the inventor provides the accompanying drawings and the following description in order for those skilled in the art to fully understand the present disclosure. The drawings and the description are not intended to limit the subject matter described in the claims.

First Embodiment

A first embodiment will be described below with reference to the drawings.

[1-1. Configuration]

Figure 1:
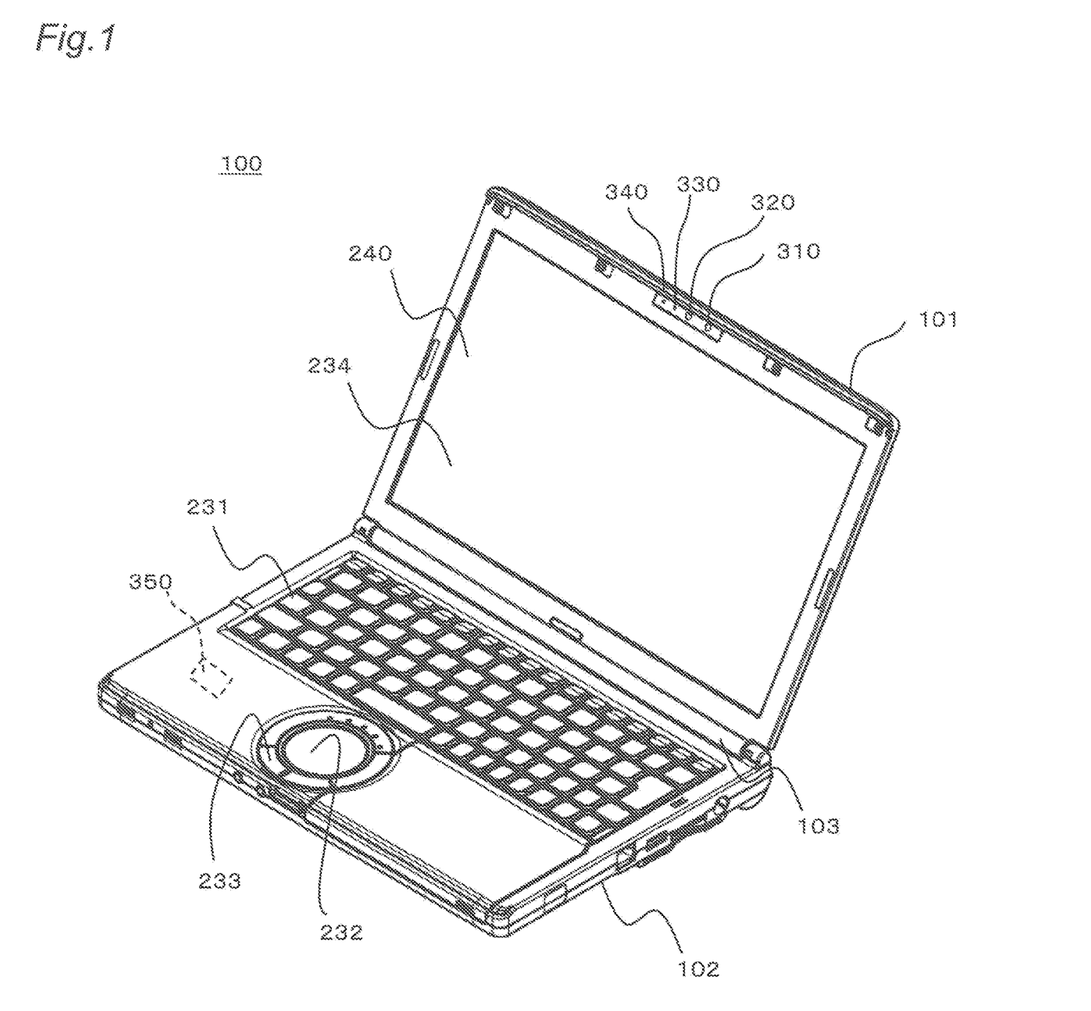
FIG. 1 is a perspective view of a computer in a first embodiment.

FIG. 1 is a perspective view of a computer according to the first embodiment.

A computer 100 includes a first casing 101 and a second casing 102, and is a notebook computer in which the first casing 101 and the second casing 102 are configured to be rotatable relative to each other via a hinge 103.

The first casing 101 includes a display 240, a touch panel 234, an RGB camera 310, an infrared camera 320, an infrared ray emitter 330, a proximity sensor 340, and the like.

The second casing 102 is provided with a keyboard 231, a touch pad 232, an operation button 233, a temperature sensor 350, and the like.

The display 240 displays an image or video based on the input image signal. The display 240 is configured by a liquid crystal display, for example.

The touch panel 234 is provided so as to overlap the surface of the display 240. The touch panel 234 is a pointing device that outputs a signal indicating a touched position on the display 240. The output function of the signal indicating the touched position on the display 240 may be formed integrally with the display 240.

The RGB camera 310 includes an optical lens, an RGB imaging sensor, and the like, captures a visible light image of a subject imaged on the RGB imaging sensor by the optical lens, and generates and outputs an image signal indicating the captured visible light image. The RGB camera 310 can periodically capture a visible light image at a predetermined frame rate.

The infrared ray emitter 330 emits infrared rays (infrared light). The infrared ray emitter 330 is configured by, for example, a ray emitting diode that emits infrared rays.

The infrared camera 320 includes an optical lens, an infrared pass filter, a monochrome imaging sensor having a predetermined resolution, and the like, and captures an infrared image of a subject imaged on the monochrome imaging sensor by the optical lens in a state where the infrared ray emitter 330 emits infrared rays to generate and output a signal indicating the captured infrared image.

The proximity sensor 340 detects that an object approaches the proximity sensor 340 within a predetermined distance (within a predetermined range). The proximity sensor 340 may be any sensor such as an inductive type, a capacitance type, an ultrasonic type, a photoelectric type, or a magnetic type as long as it can detect that the object approaches within a predetermined range.

The keyboard 231 includes a plurality of keys and outputs a signal corresponding to the key pushed by the user.

The touch pad 232 is a pointing device that outputs a signal corresponding to the position touched by the user.

The operation button 233 is a push button switch, and outputs a signal indicating that the button is pushed when the button is pushed by the user. The operation button 233 is used as, for example, a determination button.

The devices, which receive the input operation of the user, such as the keyboard 231, the touch pad 232, the operation buttons 233, and the touch panel 234 are hereinafter collectively referred to as "input devices 230".

Figure 2:
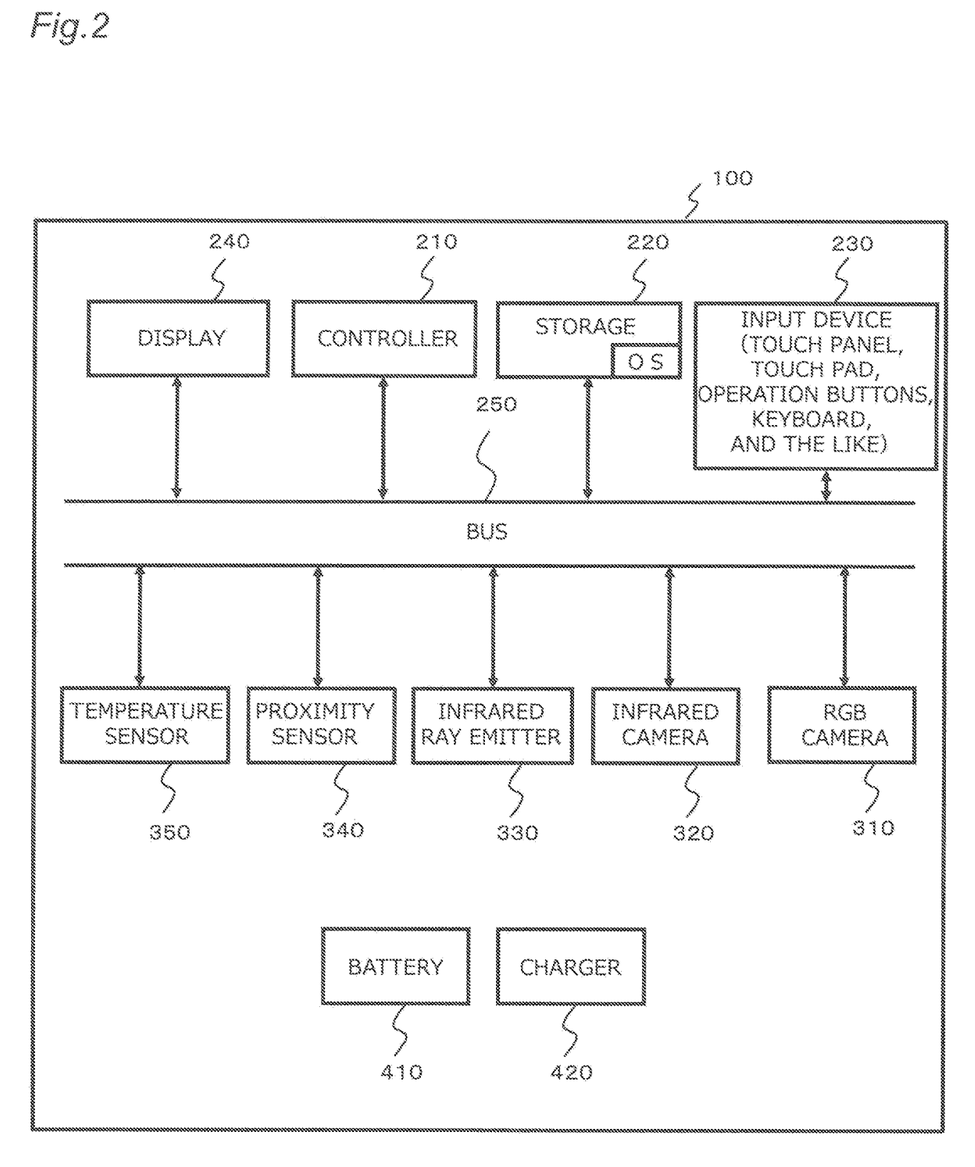
FIG. 2 is a block diagram illustrating an electrical configuration of a computer.

FIG. 2 is a block diagram illustrating an electrical configuration of the computer 100. The computer 100 further includes a controller 210, a storage 220, a bus 250, a battery 410, a charger 420, and the like.

The storage 220 stores an OS and various application programs and data.

The controller 210 controls the overall operation of the computer 100. The controller 210 performs an arithmetic process based on the OS and various application programs stored in the storage 220, the data stored in the storage 220, and the information input from various input devices 230 or the like, so as to realize various functions to be described later. The controller 210 is configured of, for example, a CPU, an MPU, an FPGA, and the like.

Each element described above is connected to the bus 250. The bus 250 is a signal path for the components described above to transmit and receive various signals to each other.

The battery 410 supplies power for operation to each component of the computer 100.

The charger 420 charges battery 410.

[1-2. Operation]

The controller 210 performs authentication process at the time of logon at the time of starting the computer or at the time of unlocking. In the authentication process, the infrared ray emitter 330 and the infrared camera 320 are driven, and a three-dimensional face authentication process is performed based on the captured infrared image. In the case that personal three-dimensional face data is registered in advance in the computer 100 and a face is included in the captured infrared image, the three-dimensional face authentication process is a process for determining whether or not the included face matches the face indicated by the registered three-dimensional face data. As a specific technique of the three-dimensional face authentication based on the infrared image, a known technique performed by an OS such as Windows (registered trademark) can be used.

Here, in order to increase the accuracy of the three-dimensional face authentication, it is necessary to emit relatively strong infrared rays from the infrared ray emitter 330, and the power consumption of the infrared ray emitter 330 increases. In addition, in the conventional three-dimensional face authentication based on infrared images on the computer, the three-dimensional face authentication using an infrared ray emitter and an infrared camera starts when a logon screen or unlock screen is displayed. The infrared rays continue to be emitted until the three-dimensional face authentication is completed. Therefore, when the three-dimensional face authentication is not successful for a long time, and the infrared ray emitter and the infrared camera continue to be driven, a large amount of battery power is consumed, and the driving time of the computer is reduced. In addition, the temperature of the computer rises due to heat generated by large power consumption.

In order to solve this problem, in this embodiment, when the logon screen or the unlock screen is displayed at the time of starting the computer, whether or not there is a predetermined change in the status of the computer 100 or the status of the surroundings of the computer is determined based on the signal output from a status signal outputter that outputs a signal related to the status of the computer 100 or the status of the surroundings of the computer, and the infrared ray emitter 330 and the infrared camera 320 are configured to be driven when there is a predetermined change. In the present embodiment, the description will be given in detail about an example in which the status signal outputter is the RGB camera 310 (visible light camera), and the predetermined change is that the content of the visible light image captured by the RGB camera 310 changes by a predetermined extent with respect to the content of the previous captured visible light image.

Figure 3:
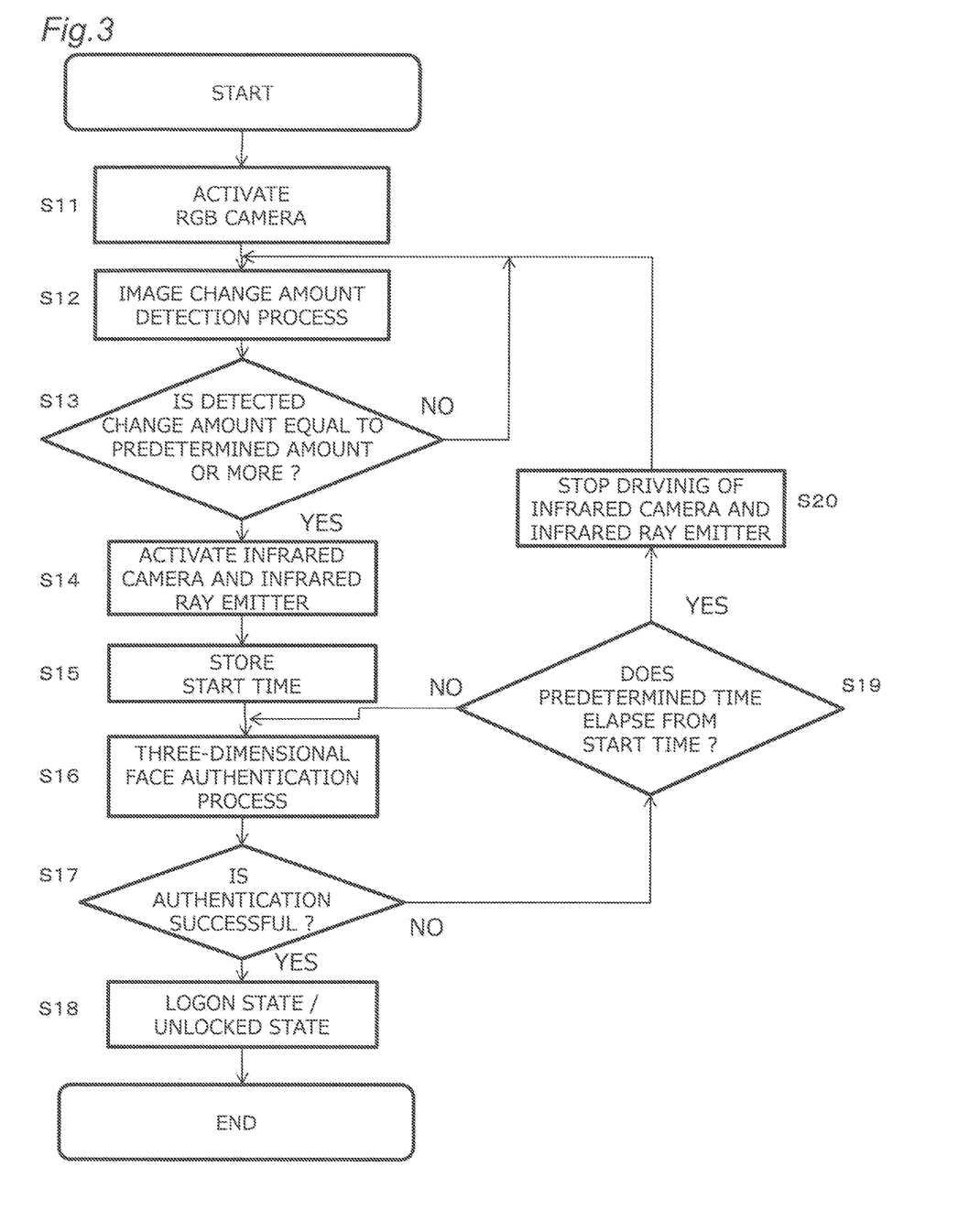
FIG. 3 is an example of a flowchart of a three-dimensional face authentication process.

FIG. 3 is an example of a flowchart of the three-dimensional face authentication process. The controller 210 activates the RGB camera 310 when the logon screen or the unlock screen is displayed on the display 240 (S11). At this time, the RGB camera 310 periodically captures and outputs images at a predetermined frame rate. The predetermined frame rate is, for example, 30 fps or 60 fps, which is the same as that for capturing moving image.

Whenever a new frame image is received from the RGB camera 310, the controller 210 performs a detection process of a change amount (image change amount detection process) on the previous frame image (S12). As the change amount, for example, the magnitude of the motion vector obtained by comparing the frame image received this time with the previous frame image can be used.

The controller 210 determines whether or not the detected change amount is equal to a predetermined amount or more (S13). The predetermined amount may be appropriately set according to the degree of change to be detected.

When the change amount is not equal to the predetermined amount or more (NO in S13), the controller 210 executes the image change amount detection process of step S12 again.

When the change amount is equal to the predetermined amount or more (YES in S13), the controller 210 activates the infrared camera 320 and the infrared ray emitter 330 (S14).

The controller 210 stores the current time as the start time (S15).

The controller 210 executes the three-dimensional face authentication process (S16).

The controller 210 determines whether or not the authentication is successful in the three-dimensional face authentication process (S17).

When the authentication is successful (YES in S17), the controller 210 causes the computer 100 to transition to the logon state or the unlocked state (S18).

When the authentication is not successful (NO in S17), the controller 210 determines whether or not a predetermined time elapses from the start time (S19). The predetermined time is, for example, five seconds, but is not limited thereto.

When the predetermined time does not elapse (NO in S19), the controller 210 executes the three-dimensional face authentication process of step S16 again.

When the predetermined time elapses (YES in S19), the controller 210 stops driving the infrared camera 320 and the infrared ray emitter 330 (S20), and then executes the image change amount detection process of step S12 again.

According to the present embodiment, when the change amount of the image captured by the RGB camera 310 is equal to the predetermined amount or more, the infrared camera 320 and the infrared ray emitter 330 are driven to perform the three-dimensional face authentication process.

Therefore, the driving time of the infrared camera 320 and the infrared ray emitter 330 can be reduced, and the power consumption of the three-dimensional face authentication process using infrared rays can be reduced.

Second Embodiment

A second embodiment will be described. In the present embodiment, the description will be given about an example in which the status signal outputter is the RGB camera 310 (visible light camera) that captures a visible light image, the controller 210 performs a face detection process on the visible light image captured by the RGB camera 310, and the predetermined change is that a face is detected in the face detection process.

Figure 4:
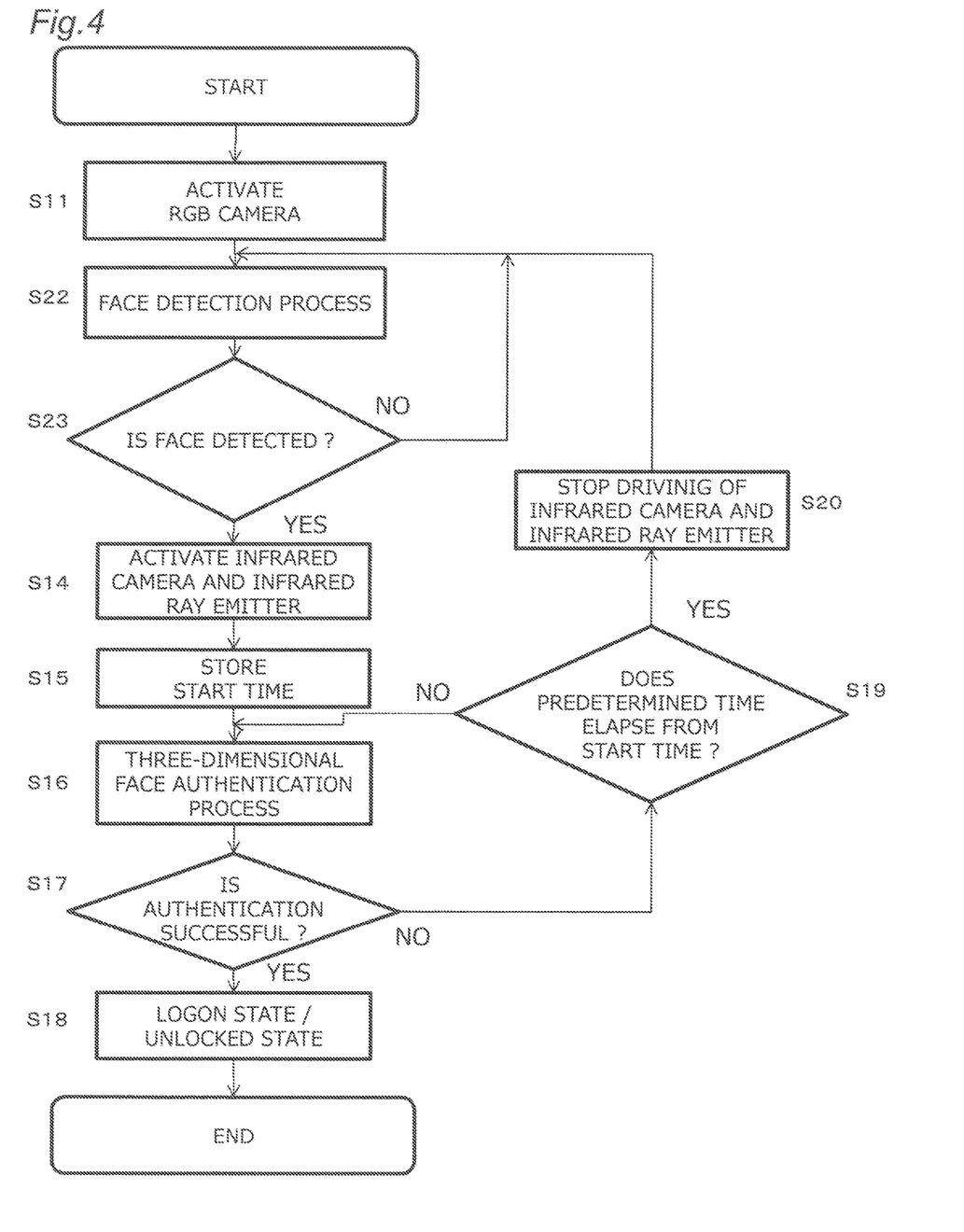
FIG. 4 is an example of a flowchart of a three-dimensional face authentication process of a computer in a second embodiment.

FIG. 4 is an example of a flowchart of the three-dimensional face authentication process of the computer 100 according to the second embodiment. In the present embodiment, steps S22 and S23 are provided instead of steps S12 and S13 of the first embodiment. Hereinafter, the difference from the first embodiment will be mainly described.

Whenever a new frame image is received from the RGB camera 310, the controller 210 performs a face detection process of a face (face detection process) on the received image (S22).

The controller 210 determines whether or not a face is detected in the received frame image by the face detection process (S23).

If a face is not detected (NO in S23), the controller 210 executes the face detection process of step S22 again.

When a face is detected (YES in S23), the controller 210 activates the infrared camera 320 and the infrared ray emitter 330 (S14). Thereafter, the same process as in the first embodiment is performed. When driving of the infrared camera 320 is stopped in step S20, the controller 210 executes the face detection process of step S22 again.

According to the present embodiment, when a face is detected in the image captured by the RGB camera 310, the infrared camera 320 and the infrared ray emitter 330 are driven to perform the three-dimensional face authentication process. Therefore, the driving time of the infrared camera 320 and the infrared ray emitter 330 can be further reduced, and the power consumption of the three-dimensional face authentication process using infrared rays can be further reduced.

Note that a two-dimensional face authentication process based on the image captured by the RGB camera 310 may be performed instead of the face detection process. Note that the two-dimensional face authentication process here does not need to be so rigorous as to cause rejection to the original user, and it may be sufficient to narrow down the target for the three-dimensional face authentication.

Third Embodiment

A third embodiment will be described. In the present embodiment, the description will be given about an example in which the status signal outputter is the proximity sensor 340 that detects that an object approaches within a predetermined range, and the predetermined change is that the proximity sensor 340 detects that the object approaches within a predetermined range.

Figure 5:
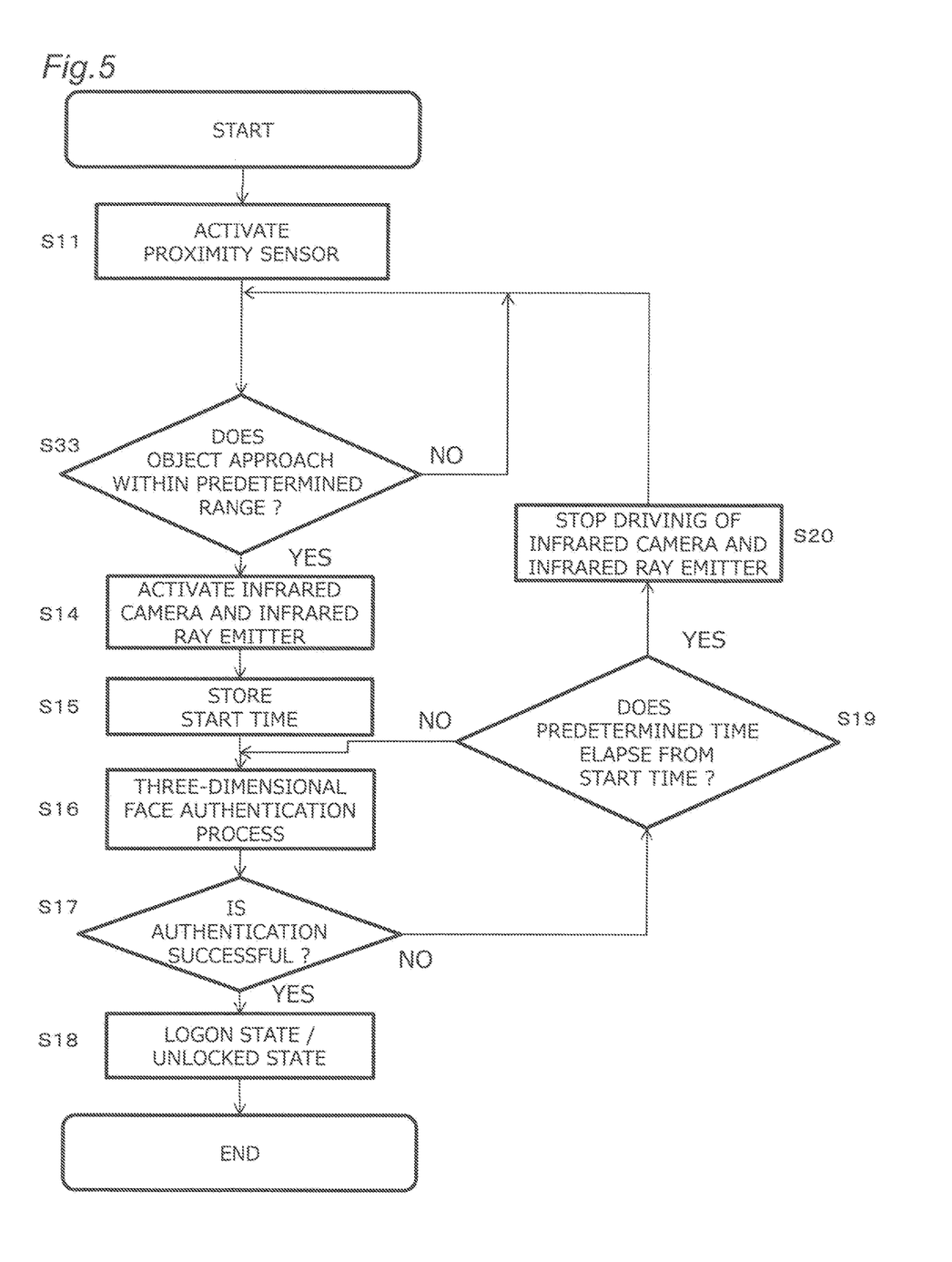
FIG. 5 is an example of a flowchart of a three-dimensional face authentication process of a computer in a third embodiment.

FIG. 5 is an example of a flowchart of the three-dimensional face authentication process of the computer 100 according to the third embodiment. In the present embodiment, steps S31 and S33 are provided instead of steps S11, S12 and S13 of the first embodiment. Hereinafter, the difference from the first embodiment will be mainly described.

The controller 210 activates the proximity sensor 340 when the computer 100 is activated or when the lock screen of the computer 100 is displayed after elapsing of a predetermined no-operation time (S31).

The controller 210 determines whether or not an object approaches the proximity sensor 340 within a predetermined range based on the signal output from the proximity sensor 340 (S33). It is also determined whether or not an object approaches the computer 100.

If the object does not approach within the predetermined range (NO in S33), the controller 210 executes the determination in step S33 again.

When an object approaches within the predetermined range (YES in S33), the controller 210 activates the infrared camera 320 and the infrared ray emitter 330 (S14). Thereafter, the same process as in the first embodiment is performed. When driving of the infrared camera 320 is stopped in step S20, the controller 210 executes the process of step S33 again.

According to the present embodiment, when the proximity sensor 340 detects that an object approaches within the predetermined range, the infrared camera 320 and the infrared ray emitter 330 are driven to perform the three-dimensional face authentication process. Therefore, the driving time of the infrared camera 320 and the infrared ray emitter 330 can be reduced, and the power consumption of the three-dimensional face authentication process using infrared rays can be reduced.

Fourth Embodiment

A fourth embodiment will be described. In the present embodiment, the description will be given about an example in which the status signal outputter is the input device 230 that accepts a user's input operation, and the predetermined change is that the input operation is performed to the input device 230.

Figure 6:
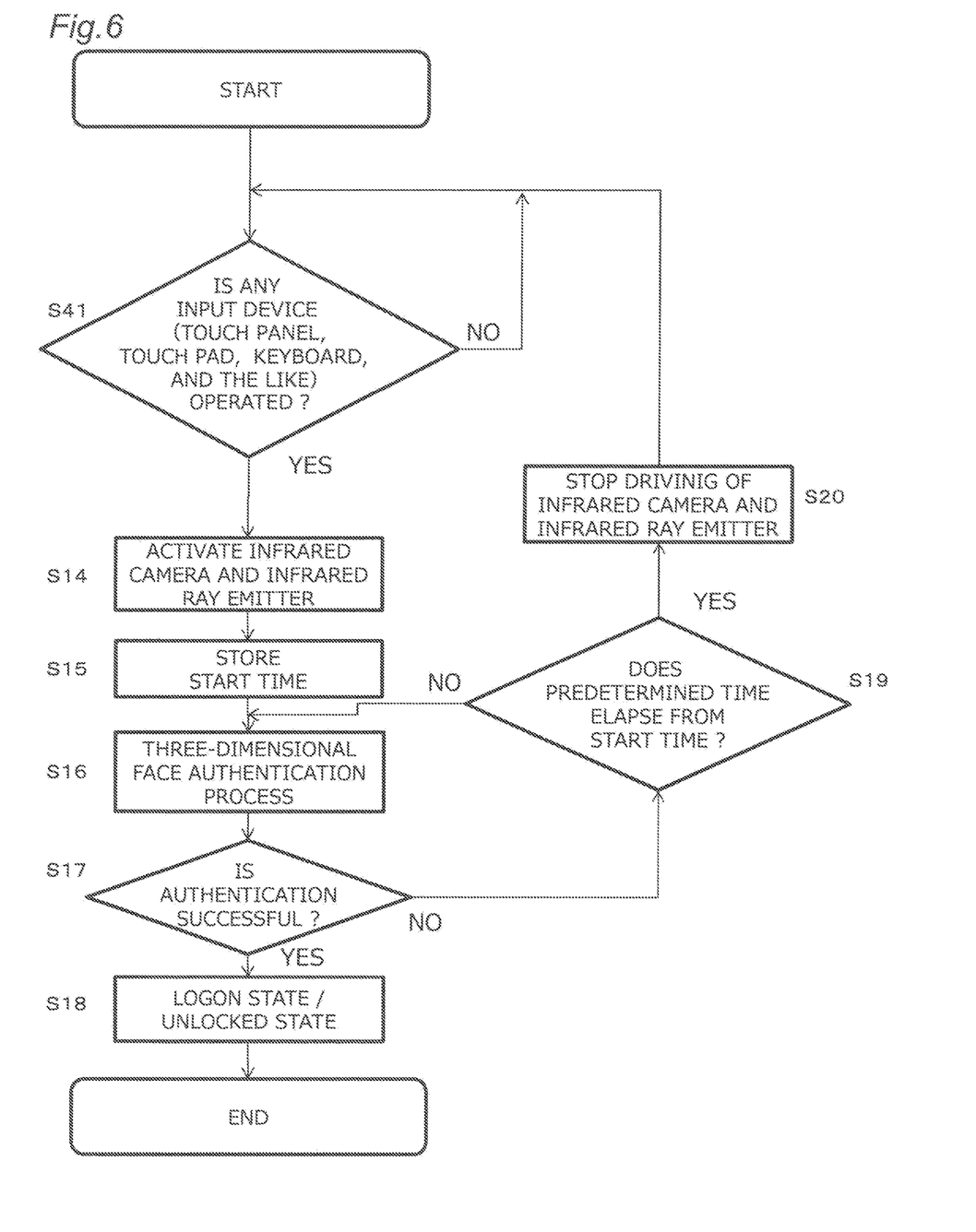
FIG. 6 is an example of a flowchart of a three-dimensional face authentication process of a computer in a fourth embodiment.

FIG. 6 is an example of a flowchart of the three-dimensional face authentication process of the computer 100 according to the fourth embodiment. In the present embodiment, step S41 is provided instead of steps S11, S12, and S13 of the first embodiment. Hereinafter, the difference from the first embodiment will be mainly described.

The controller 210 determines whether or not any input device 230 is operated when the logon screen or the unlock screen is displayed on the display 240 (S41). When the controller 210 receives a signal related to an operation from any of the input devices 230, the controller 210 determines that the input operation is performed on any of the input devices 230.

When the input operation is not performed on any of the input devices 230 (NO in S41), the controller 210 executes the determination of step S41 again.

When an input operation is performed on any of the input devices 230 (YES in S41), the controller 210 activates the infrared camera 320 and the infrared ray emitter 330 (S14). Thereafter, the same process as in the first embodiment is performed. When driving of the infrared camera 320 is stopped in step S20, the controller 210 executes the process of step S41 again.

According to the present embodiment, when an operation is performed on any of the input devices 230, the infrared camera 320 and the infrared ray emitter 330 are driven to perform the three-dimensional face authentication process. That is, when there is an intention to operate the computer 100, the three-dimensional face authentication process by the infrared camera 320 is performed. Therefore, the driving time of the infrared camera 320 and the infrared ray emitter 330 can be reduced, and the power consumption of the three-dimensional face authentication process using infrared rays can be reduced.

Fifth Embodiment

In the first to fourth embodiments, the controller 210 determines whether or not a predetermined time elapses from the start time in step S19. However, instead of the above determination in step S19, it may be determined whether or not the temperature of a predetermined part of the computer 100 exceeds a predetermined temperature. In this case, the controller 210 inputs a signal indicating the temperature from the temperature sensor 350 arranged at the predetermined part. The predetermined temperature is, for example, the highest temperature in a range that does not cause a low-temperature burn to the user. Thereby, the occurrence of a low-temperature burn can be suppressed with power consumption. The predetermined part is, for example, a part where the controller 210 is disposed. The predetermined part may be a part where the infrared ray emitter 330, the input device 230, the battery 410, the charger 420, or the like are disposed, for example. Note that it may be determined whether or not at least one of the facts that a predetermined time elapses from the start time and that the temperature of a predetermined part of the computer 100 exceeds a predetermined temperature is established.

(Effects)

(1) The computer 100 (an example of a personal authentication device) of this embodiment includes:
the infrared ray emitter 330 that emits infrared rays;
the infrared camera 320 that captures infrared images;
the status signal outputter that outputs a signal related to the status of the computer 100 (personal authentication device) or the status of the surroundings of the computer; and
the controller 210.

The controller 210 determines whether or not there is a predetermined change in the status of the computer 100 or the status of the surroundings of the computer based on the signal output from the status signal outputter. When there is a predetermined change, the controller 210 drives the infrared ray emitter 330 and the infrared camera 320 are driven, and performs a three-dimensional face authentication process based on the infrared image captured by the infrared camera 320.

With this, when it is determined based on the signal output from the status signal outputter that there is a predetermined change in the status of the computer 100 or the status of the surroundings of the computer, the infrared ray emitter 330 and the infrared camera 320 are driven, and the three-dimensional face authentication process is performed. Therefore, the driving time of the infrared camera 320 and the infrared ray emitter 330 can be reduced, and the power consumption of the three-dimensional face authentication process using infrared rays can be reduced.

(2) In this embodiment,
when the three-dimensional face authentication is not successful even after the infrared ray emitter 330 and the infrared camera 320 are driven for a predetermined time after driving, the controller 210 stops driving the infrared ray emitter 330 and the infrared camera 320.

When the three-dimensional face authentication is not successful even after the infrared ray emitter 330 and the infrared camera 320 are driven for a predetermined time, it is conceivable that there were no users in front of the infrared camera 320. Therefore, wasteful power consumption is suppressed by stopping driving the infrared ray emitter 330 and the infrared camera 320.

(3) In this embodiment,
the controller 210 stops driving the infrared ray emitter 330 and the infrared camera 320 when the temperature of the predetermined part of the computer 100 is a predetermined temperature or higher.

With this, the occurrence of the low-temperature burn can be suppressed with a reduction in power consumption.

(4) In this embodiment,
the status signal outputter is the RGB camera 310 (visible light camera) that periodically captures visible light images.

The predetermined change is that the content of the visible light image captured by the RGB camera 310 changes by a predetermined extent with respect to the content of the previous captured visible light image.

With this, when the content of the visible light image captured by the RGB camera 310 changes by a predetermined extent with respect to the content of the previous captured visible light image, the infrared camera 320 and the infrared ray emitter 330 are driven to perform three-dimensional face authentication process. Therefore, it is possible to reduce the driving time of the infrared camera 320 and the infrared ray emitter 330, and to suppress the power consumption of the infrared ray emitter 330 and the infrared camera 320.

(5) In this embodiment,
the status signal outputter is the RGB camera 310 (visible light camera) that captures a visible light image.

The controller 210 performs the face detection process on the visible light image captured by the RGB camera 310.

The predetermined change is that a face is detected in the face detection process.

With this, when a face is detected in a visible light image captured by the RGB camera 310, the infrared camera 320 and the infrared ray emitter 330 are driven to perform the three-dimensional face authentication process.

Therefore, it is possible to reduce the driving time of the infrared camera 320 and the infrared ray emitter 330, and to suppress the power consumption of the infrared ray emitter 330 and the infrared camera 320.

(6) In this embodiment, the status signal outputter is the proximity sensor 340 that detects that the object approaches within a predetermined range.

The predetermined change is that the proximity sensor 340 detects that the object approaches within the predetermined range.

With this, when the proximity sensor 340 detects that the object approaches the predetermined range, the infrared ray emitter 330 and the infrared camera 320 are driven to perform the three-dimensional face authentication process. Therefore, it is possible to reduce the driving time of the infrared camera 320 and the infrared ray emitter 330, and to suppress the power consumption of the infrared ray emitter 330 and the infrared camera 320.

(7) In this embodiment, the status signal outputter is the input device 230 that accepts a user's input operation.

The predetermined change is that the input operation is performed on the input device 230.

With this, when an operation is performed on any of the input devices 230, the infrared ray emitter 330 and the infrared camera 320 are driven to perform the three-dimensional face authentication process. Therefore, it is possible to reduce the driving time of the infrared camera 320 and the infrared ray emitter 330, and to suppress the power consumption of the infrared ray emitter 330 and the infrared camera 320.

Other Embodiments

As described above, the first embodiment has been described as an example of the technique disclosed in the present application. However, the technology in the present disclosure is not limited to this, and can also be applied to embodiments in which changes, replacements, additions, omissions, and the like have been made as appropriate. Further, it is possible to combine the components described in the first embodiment to form a new embodiment. Thus, other embodiments will be exemplified below.

(1) In the above embodiment, the case where the personal authentication device according to the present disclosure is applied to a notebook computer has been described. However, the present disclosure can be widely applied to devices, which have a function of performing the three-dimensional face authentication using an infrared camera, such as a smartphone, a tablet computer, a portable game device, a digital camera, and an ATM device in addition to a notebook computer.

As described above, the embodiments have been described as examples of the technology in the present disclosure. For this purpose, the accompanying drawings and detailed description are provided. Accordingly, the components described in the accompanying drawings and the detailed description may also include the components not essential for solving the problem in order to illustrate the above technique as well as the components essential for solving the problem. Therefore, it should not be recognized that the non-essential components are essential just based on the fact that those non-essential components are described in the accompanying drawings and detailed description. Moreover, since the above-described embodiment is for demonstrating the technique in this disclosure, a various change, replacement, addition, abbreviation, or the like can be performed in a claim or its equivalent range.

INDUSTRIAL APPLICABILITY

The present disclosure can be widely used in electronic devices that perform the three-dimensional face authentication using an infrared camera.

What is claimed is:

1. A personal authentication device comprising:
   an infrared ray emitter that emits infrared rays;
   an infrared camera that captures an infrared image;
   a status signal outputter that outputs a signal related to a status of the personal authentication device or a status of surroundings of the personal authentication device; and
   a controller,
   wherein:
   the controller determines whether or not there is a predetermined change in the status of the personal authentication device or the status of the surroundings of the personal authentication device based on a signal output from the status signal outputter, and when there is the predetermined change, the controller starts to drive the infrared ray emitter and the infrared camera, and performs a three-dimensional face authentication process based on a face included in the infrared image captured by the infrared camera,
   the three-dimensional face authentication process is successful when the face included in the infrared image captured by the infrared camera matches a face indicated by a three-dimensional face data registered in advance, and is unsuccessful otherwise, and
   the controller is configured to track an amount of time that the infrared ray emitter and the infrared camera have been continuously driven and stop driving the infrared ray emitter and the infrared camera upon determining that the infrared ray emitter and the infrared camera have been continuously driven for a predetermined amount of time without the three-dimensional face authentication being successful.

2. The personal authentication device according to claim 1, wherein the controller stops driving the infrared ray emitter and the infrared camera when a temperature of a predetermined part of a device is equal to a predetermined temperature or higher.

3. The personal authentication device according to claim 1, wherein
   the status signal outputter is a visible light camera that periodically captures a visible light image, and
   the predetermined change is that content of the visible light image captured by the visible light camera changes by a predetermined extent with respect to content of a previous captured visible light image.

4. The personal authentication device according to claim 1, wherein
   the status signal outputter is a visible light camera that captures a visible light image,
   the controller performs face detection process on the visible light image captured by the visible light camera, and
   the predetermined change is that a face is detected in the face detection process.

5. The personal authentication device according to claim 1, wherein the status signal outputter is a proximity sensor that detects that an object approaches within a predetermined range, and the predetermined change is that the proximity sensor detects that the object approaches within the predetermined range.

6. The personal authentication device according to claim 1, wherein the status signal outputter is an input device that accepts a user's input operation, and the predetermined change is that the input operation is performed on the input device.

\* \* \* \* \*